Jan. 24, 1956
D. A. CUSANO ET AL
2,732,313
CATHODE RAY LUMINESCENT SCREENS
Filed Aug. 23, 1951
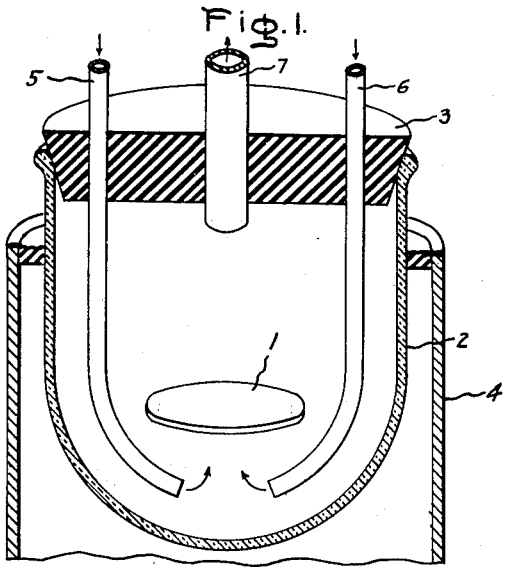
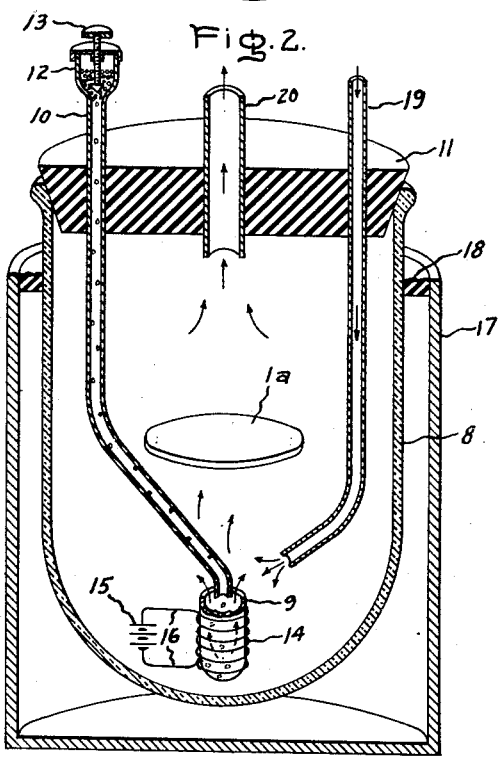
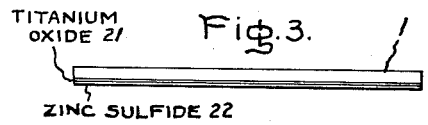
Inventors:
Dominic A. Cusano,
Frank J. Studer,
by Paul A. Frank
Their Attorney.

250
United States Patent Office 2,732,313
Patented Jan. 24, 1956

2,732,313

CATHODE RAY LUMINESCENT SCREENS

Dominic A. Cusano and Frank J. Studer, Schenectady, N. Y., assignors to General Electric Company, a corporation of New York Application August 23, 1951, Serial No. 243,271

10 Claims. (Cl. 117—33.5)

The present invention relates to luminescent screens, such as the screens which become luminous when cathode rays impinge thereon.

In a prior application Ser. No. 200,908, filed by us on December 15, 1950, now Patent No. 2,675,331 (and assigned to the same assignee as the present application), we have described an improved cathode ray screen which is glassy and transparent as contrasted with cathode ray screens heretofore commonly used which were powdery in appearance and were light-scattering. The transparent screens may be prepared by causing deposition on a suitable support of a compound in which the metallic constituent consists either of zinc or cadmium alone, or in admixture and in which a combining ingredient consists either of sulfur or selenium. Such compound is deposited, suitably activated, on a heated base as a transparent film.

The present invention which includes both a method and the product thereof provides an improvement in such transparent luminescent screens. The feature of novelty and improvement are the addition to such screens of a new transparent base member whereby such screens are made sufficiently conductive to obviate undesired accumulation of electric charges which interfere with the fidelity of image production.

In a cathode ray screen embodying our present improvement, a film of transparent titanium compound underlies the transparent film of sulfide (or selenide) of zinc (or cadmium).

The accompanying drawing shows in Fig. 1 a vertical section of an apparatus for depositing such foundation film; Fig. 2 is a vertical section of an apparatus for subsequently depositing zinc sulfide or equivalent film material on said foundation film; and Fig. 3 is an enlarged cross-section of a glass plate having thereon coatings embodying our invention.

Referring to Fig. 1 a plate 1 of transparent material, ordinarily glass, is suitably supported in a reaction chamber comprising a housing 2 having a cover 3, and external heating means, such as an oven 4 conventionally indicated and shown in part broken away. Titanium chloride vapor is supplied by a conduit 5, passing through the cover 3. The plate 1 is heated to about 150 to 200° C. in any convenient way, for example, by the external oven 4. Water vapor is supplied by a conduit 6 which also passes through the cover. By the chemical interaction of these vapors titanium dioxide is formed, and is deposited on the plate 1 as a transparent film, which may be of a tenth of a micron or more in thickness. By-products of this reaction and unreacted vapors are exhausted through a conduit 7.

The plate now film-coated and for distinction designated as 1a, is removed from the first reaction chamber 2 and is transferred immediately to a second reaction chamber 8, such as shown in Fig. 2. As illustrated conventionally the coated plate 1a is supported (by means not shown) above a refractory receptacle 9 which may be constructed to yield vapor of zinc or zinc chloride. This receptacle communicates with a conduit 10 which passes through the cover 11 of the second reaction chamber. Material to be vaporized is supplied from a hopper 12 containing a valve 13. The vaporizer 9, which may consist of Alundum or fused quartz, is wound with resistance wire 14 connected to a source of current conventionally represented by a battery 15 and conductors 16.

As illustrative of the deposition upon the titanium oxide base coating of a superimposed transparent luminescent film, we shall describe the formation of a zinc sulfide film.

The reaction chamber having the coated plate 1a suitably supported therein is heated to a temperature range of about 500° to 600° C. for example by being surrounded by an oven 17 to the extent shown, a refractory retaining ring 18 keeping the chamber 8 in a desired position. The heater has been illustrated conventionally, as any suitable source may be employed. Particles of zinc chloride or zinc are fed from the hopper 12 through the conduit 10, by manipulating the valve 13, and from thence by gravity into the receptacle 9 which is heated to a temperature sufficiently high to evolve vapor of zinc chloride or zinc. A small quantity of suitable activator, for example, manganese chloride also is introduced and volatized at the same time as the zinc or zinc compound vapors. At the same time, hydrogen sulfide gas is introduced by the conduit 19. By chemical reaction zinc sulfide is formed and deposited on the filmed surface of the heated plate 1a. By-products and uncombined excess gas or vapor are carried away by a conduit 20.

The resulting film of zinc sulfide is luminescent when excited by cathode rays, as in a cathode ray tube. As shown in Fig. 3 the completed article comprises a base 1 of glass or other transparent material, a film 21 of titanium dioxide thereon and a superimposed film 22 of zinc sulfide. The electrical resistivity of the completed film is as low as 4000 ohms per square, or even lower. Such reduction of about a thousand fold in resistivity permits undesired electric charges to be dissipated from the film when made luminous by cathode rays impinged thereon. The luminous efficiency of the composite film 22 is about the same as the luminous efficiency of zinc sulfide films alone when deposited directly on glass.

The zinc sulfide layer if desired may be removed subsequently.

In this process the underlying titanium dioxide (TiO₂) film 21 which originally had a resistance of several thousand megohms per square, becomes conducting with a resistance of about 4000 ohms per square or even lower. This increase of conductivity may be due to the migration from the film 22 of zinc or sulfur atoms or both into the film 21, or to the reduction of part of the titanium dioxide of the film 21 by the zinc or cadmium to the state of a lower oxide. If the zinc sulfide layer is removed by washing in hydrochloric acid, the resistance of the residual titanium dioxide film remains at the same low value.

In similar manner films of cadmium sulfide, or films of zinc-cadmium sulfide may be deposited upon the titanium dioxide film 21 with similar result. The sulfur component of the overlying films may be replaced partly or wholly by selenium.

What we claim as new and desire to secure by Letters Patent of the United States is:

1. A luminescent film which is substantially immune to the accumulation of electric charges thereon comprising the combination of a transparent support, a transparent film of titanium dioxide on said support and an overlying transparent film thereon consisting of activated material comprising a metal selected from the class consisting of zinc, cadmium and mixtures thereof chemically combined with a non-metal selected from the class consisting of sulfur and selenium, the electrical resistance of said titanium dioxide film being as low as about 4000 ohms per square.

2. A luminescent screen comprising the combination of a glass base, a film thereon of transparent titanium dioxide and a superimposed transparent film of activated zinc sulfide, said titanium dioxide film having an electrical resistivity as low as about 4000 ohms per square.

3. The method of making a luminescent film which is responsive to cathode rays which consists in vapor depositing on a heated base of glass in a vacuum a film of titanium oxide, heating the resultant film coated base to about 500 to 600° C. and while thus heated forming on such base an activated film by chemical reaction at elevated temperature of vapor of metal selected from the group consisting of zinc, cadmium and mixtures thereof and vapor of non-metal selected from the group consisting of sulfur and selenium.

4. The method of making an electrically conductive titanium oxide film comprising depositing from vapor on a heated base of glass a transparent film of titanium oxide, heating the resultant film coated base to about 500° C. to 600° C. and while said film is heated depositing thereon from vapor a film of a compound selected from the group consisting of zinc sulfide, zinc selenide, cadmium sulfide, and cadmium selenide, thereby to increase the conductivity of said titanium oxide film, and subsequently removing said compound film to leave said increased conductivity titanium oxide film exposed.

5. The method of claim 4 wherein the compound is condensed on the titanium oxide film from the vapor phase in an atmosphere of hydrogen sulfide.

6. The method of claim 4 wherein the titanium oxide is deposited on the glass base in the presence of water vapor.

7. The method of claim 4 wherein the compound is zinc sulfide.

8. The method of making an electrically conductive titanium oxide film comprising condensing a titanium oxide film on a base of transparent glassy material heated to 150° C. to 200° C. from an atmosphere containing titanium tetrachloride vapor and water vapor, heating said material to a temperature of about 500° C. to 600° C., reacting hydrogen sulfide vapor with the vapor of a substance selected from the group consisting of zinc, zinc chloride, cadmium, and mixtures thereof in the vicinity of said titanium oxide to deposit a film of a sulfide of the group consisting of zinc, cadmium, and mixtures thereof on said titanium oxide film thereby to increase the conductivity of said titanium oxide film, and removing the sulfide film.

9. The method of claim 8 wherein the sulfide film is removed by contacting the film with hydrochloric acid.

10. The method of making an electrically conductive titanium oxide film comprising condensing a titanium oxide film on a base of transparent glassy material heated to 150° C. to 200° C. from an atmosphere containing titanium tetrachloride vapor and water vapor, heating said material to a temperature of about 500° C. to 600° C., and reacting hydrogen sulfide vapor with the vapor of a substance selected from the group consisting of zinc, zinc chloride, cadmium, and mixtures thereof in the vicinity of said titanium oxide to deposit a film of a sulfide of the group consisting of zinc, cadmium, and mixtures thereof on said titanium oxide film.

References Cited in the file of this patent

UNITED STATES PATENTS

| | | |
|---|---|---|
| 2,060,977 | De Boer et al. | Nov. 17, 1936 |
| 2,161,458 | De Boer et al. | June 6, 1939 |
| 2,280,939 | Weinhart | Apr. 28, 1942 |
| 2,462,517 | Leverenz | Feb. 22, 1949 |